United States Patent
Pan et al.

(10) Patent No.: US 11,009,181 B2
(45) Date of Patent: *May 18, 2021

(54) CONTROL DEVICE FOR A GIMBAL AND METHOD OF CONTROLLING THE SAME

(71) Applicant: SZ DJI OSMO TECHNOLOGY CO., LTD., Shenzhen (CN)

(72) Inventors: Paul Pan, Shenzhen (CN); Ming Liang Zhu, Shenzhen (CN); Xi Feng Zhao, Shenzhen (CN)

(73) Assignee: SZ DJI OSMO TECHNOLOGY CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/908,343

(22) Filed: Jun. 22, 2020

(65) Prior Publication Data
US 2020/0318779 A1    Oct. 8, 2020

Related U.S. Application Data

(63) Continuation of application No. 16/508,915, filed on Jul. 11, 2019, now Pat. No. 10,690,283, which is a
(Continued)

(51) Int. Cl.
*G03B 17/56* (2021.01)
*F16M 11/18* (2006.01)
(Continued)

(52) U.S. Cl.
CPC ............ *F16M 11/18* (2013.01); *F16M 11/12* (2013.01); *G03B 17/561* (2013.01); *G05D 3/00* (2013.01);
(Continued)

(58) Field of Classification Search
CPC ...... G03B 17/561; F16M 11/18; F16M 13/04; F16M 11/12; F16M 11/123; F16M 11/126; G02B 27/644; G08B 13/1963
See application file for complete search history.

(56) References Cited

U.S. PATENT DOCUMENTS 6,124,892 A    9/2000   Nakano
6,517,207 B2   2/2003   Chapman
(Continued)

FOREIGN PATENT DOCUMENTS

CN    101021673 A    8/2007
CN    101320280 A    12/2008
(Continued)

OTHER PUBLICATIONS

World Intellectual Property Organization (WIPO) International Search Report and Written Opinion for PCT/CN2014/076674 dated Jan. 28, 2015 10 Pages.
(Continued)

*Primary Examiner* — Bradley Duckworth
(74) *Attorney, Agent, or Firm* — Anova Law Group, PLLC

(57) ABSTRACT

A gimbal for controlling an optical device includes a control device and a controlling assembly. The control device is configured to receive an action instruction and generate a control instruction based on the action instruction. The action instruction includes a press action instruction, and the control instruction includes a switch control instruction for switching the gimbal from a first operating mode to a second operating mode. The first operating mode and the second operating mode cause different relative movements between the gimbal and the optical device. The controlling assembly is configured to receive the control instruction from the control device and generate a performing instruction based on the control instruction for controlling the optical device.

17 Claims, 4 Drawing Sheets

Related U.S. Application Data continuation of application No. 16/117,311, filed on Aug. 30, 2018, now Pat. No. 10,352,495, which is a continuation of application No. 15/822,524, filed on Nov. 27, 2017, now Pat. No. 10,072,789, which is a continuation of application No. 15/298,836, filed on Oct. 20, 2016, now Pat. No. 9,851,046, which is a continuation of application No. PCT/CN2014/076674, filed on Apr. 30, 2014.

(51) Int. Cl.
| | |
|---|---|
| *G05D 3/00* | (2006.01) |
| *F16M 11/12* | (2006.01) |
| *G05D 3/12* | (2006.01) |
| *F16M 11/20* | (2006.01) |
| *F16M 13/02* | (2006.01) |

(52) U.S. Cl.
CPC ........... *G05D 3/12* (2013.01); *F16M 11/2014* (2013.01); *F16M 13/022* (2013.01)

(56) References Cited

U.S. PATENT DOCUMENTS

| | | | |
|---|---|---|---|
| 7,000,883 | B2 | 2/2006 | Mercadal et al. |
| 7,642,741 | B2 | 1/2010 | Sidman |
| 7,755,668 | B1 | 7/2010 | Johnston et al. |
| 8,063,791 | B2 | 11/2011 | Shibahara |
| 8,179,078 | B2 | 5/2012 | Sidman |
| 8,221,008 | B2 | 7/2012 | Kimura |
| 8,638,365 | B2 | 1/2014 | Origuchi |
| 9,122,132 | B2 | 9/2015 | Lai |
| 9,154,673 | B2 | 10/2015 | Stone |
| 9,280,038 | B1 | 3/2016 | Pan et al. |
| 9,360,740 | B2 | 6/2016 | Wagner et al. |
| 9,454,064 | B2 | 9/2016 | Roberts et al. |
| 9,557,738 | B2 | 1/2017 | Enke |
| 9,851,046 | B2 | 12/2017 | Pan et al. |
| 10,072,789 | B2 | 9/2018 | Pan et al. |
| 2004/0012674 | A1 | 1/2004 | Wada |
| 2006/0023113 | A1 | 2/2006 | Lin |
| 2006/0098118 | A1 | 5/2006 | Wasada |
| 2007/0050139 | A1 | 3/2007 | Sidman |
| 2009/0003822 | A1 | 1/2009 | Tyner |
| 2009/0073388 | A1 | 3/2009 | Dumm |
| 2010/0066831 | A1 | 3/2010 | Origuchi |
| 2010/0079101 | A1 | 4/2010 | Sidman |
| 2010/0116962 | A1 | 5/2010 | Lai et al. |
| 2012/0230668 | A1 | 9/2012 | Vogt |
| 2013/0048792 | A1 | 2/2013 | Szarek et al. |
| 2013/0343743 | A1 | 12/2013 | Yen |
| 2015/0071627 | A1 | 3/2015 | Hoang |
| 2015/0078737 | A1 | 3/2015 | Albonico et al. |
| 2015/0261070 | A1 | 9/2015 | Feng et al. |
| 2015/0285429 | A1 | 10/2015 | Le |
| 2016/0016674 | A1 | 1/2016 | Zhao et al. |
| 2016/0170289 | A1 | 6/2016 | Matt |
| 2016/0360096 | A1 | 12/2016 | Holmes |

FOREIGN PATENT DOCUMENTS

| | | |
|---|---|---|
| CN | 201203817 Y | 3/2009 |
| CN | 101432562 A | 5/2009 |
| CN | 101837931 A | 9/2010 |
| CN | 201795243 U | 4/2011 |
| CN | 201957175 U | 8/2011 |
| CN | 102238258 A | 11/2011 |
| CN | 102348057 A | 2/2012 |
| CN | 202306227 U | 7/2012 |
| CN | 202353755 U | 7/2012 |
| CN | 102996984 A | 3/2013 |
| CN | 202769211 U | 3/2013 |
| CN | 103472859 A | 12/2013 |
| CN | 203324879 U | 12/2013 |
| CN | 103926940 A | 7/2014 |
| EP | 1921499 B1 | 5/2013 |
| EP | 2759480 A1 | 7/2014 |
| JP | 2002331881 A | 11/2002 |
| JP | 2007114503 A | 5/2007 |
| JP | 2010183384 A | 8/2010 |
| JP | 2011109323 A | 6/2011 |
| JP | 2012237910 A | 12/2012 |

OTHER PUBLICATIONS youser23: "Pocket 3 axis Gimbal joystick pan/ roll/ tilt operator controller with integrated video RX", Youtube, May 21, 2013. Retrieved on May 18, 2020. https://www.youtube.com/watch?v=_Y8f2OZrSpo.

State Intellectual Patent Office of People's Republic of China (SIPO) Notification of Acceptance of Invalidity Request Annex 2: SimpleBGC Software User Manual v.2.2, dated Oct. 30, 2013.

State Intellectual Patent Office of People's Republic of China (SIPO) Notification of Acceptance of Invalidity Request Annex 3: Zenmuse Z15 User Manual V2.0, dated Mar. 27, 2013.

State Intellectual Patent Office of People's Republic of China (SIPO) Notification of Acceptance of Invalidity Request Annex 9.1: BaseCam Electronics Company Website Introduction, dated Nov. 5, 2020.

State Intellectual Patent Office of People's Republic of China (SIPO) Notification of Acceptance of Invalidity Request Annex 9.2: Baidu Library: Simple BGC Software User Manual, dated Nov. 25, 2013.

State Intellectual Patent Office of People's Republic of China (SIPO) Notification of Acceptance of Invalidity Request Annex 10.1: Download page Of Zenmuse Z15 product related documents, dated Nov. 5, 2020.

State Intellectual Patent Office of People's Republic of China (SIPO) Notification of Acceptance of Invalidity Request Annex 10.2: Zenmuse Z15 release record, dated Jun. 12, 2012.

State Intellectual Patent Office of People's Republic of China (SIPO) Notification of Acceptance of Invalidity Request Annex 10.3: the domain name information registration system of the Ministry of Industry and Information Technology queries for webpage www.djicdn.com, dated Jul. 24, 2020.

State Intellectual Patent Office of People's Republic of China (SIPO) Notification of Acceptance of Invalidity Request Annex 10.4: the domain name information registration system of the Ministry of Industry and Information Technology queries for webpage www.dji.com, dated Jul. 24, 2020.

State Intellectual Patent Office of People's Republic of China (SIPO) Notification of Acceptance of Invalidity Request Annex 10.5: Sina blog post "DJI Z15-5D2 gimbal is officially listed, mass arrival", dated Nov. 26, 2013.

State Intellectual Patent Office of People's Republic of China (SIPO) Notification of Acceptance of Invalidity Request Joint Trust Time Stamp Service Center-Stamp Certification Certificate dated Nov. 2, 2020.

CONTROL DEVICE FOR A GIMBAL AND METHOD OF CONTROLLING THE SAME

CROSS-REFERENCE

This application is a continuation of application Ser. No. 16/508,915, filed on Jul. 11, 2019, which is a continuation of application Ser. No. 16/117,311, filed on Aug. 30, 2018, now U.S. Pat. No. 10,352,495, which is a continuation of application Ser. No. 15/822,524, filed on Nov. 27, 2017, now U.S. Pat. No. 10,072,789, which is a continuation of application Ser. No. 15/298,836, filed on Oct. 20, 2016, now U.S. Pat. No. 9,851,046, which is a continuation of International Application No. PCT/CN2014/076674, filed on Apr. 30, 2014, the entire contents of all of which are hereby incorporated by reference.

TECHNICAL FIELD

The disclosure relates to a supporting and controlling structure for use in video shooting, photo taking and/or surveillance, and in particular to a controlling device and a gimbal on which the controlling device is applied as well as a method for controlling a gimbal.

BACKGROUND OF THE DISCLOSURE

Currently, in the technical fields of video shooting, photo taking and/or surveillance and so on, a carrier loaded with a video camera or a still camera, for example, an aircraft, a car, a ship, a robot and a human body and so on, inherently has high frequency vibration and low frequency vibration, and thus needs to be configured with a stable self-balancing gimbal used to be loaded with the video camera, the still camera etc. to achieve stable shooting. Meanwhile, the gimbal is widely used for entertainments and model airplane video shooting and so on. Excellent photos and/or videos in various directions may be shot by utilizing a plurality of keypads or remote controller to wirelessly control lenses of cameras to perform directional actions such as a rotation, a pitch and so on. The gimbal may be used to support such optical devices such as a video camera, a still camera, a telescope, a remote video camera and a measuring instrument and so on. According to operations of these optical devices, it is necessary for the gimbal to have stable support function and be easy to control and adjust directions of the optical device. A dynamic self-balancing gyroscopic biaxial or triaxial gimbal may achieve such fixation, support and orientation action.

In one prior art technique, the gimbal may shoot videos and/or photos in various directions by using a plurality of keypads or a remote controller to wirelessly control the optical devices to perform directional actions such as rotation and pitch. With the solution utilizing keypads and remote controller wirelessly, the angle in pitch and/or rotation direction may be controlled through a plurality of keypads, causing a bad hand feeling and low accuracy in performing actions. In addition, a receiver is required because the remote controller is operated wirelessly, so that it is inconvenient to operate, and under certain circumstances, for example, in case of a handheld remote controller, the gimbal needs to be operated by several persons at the same time.

SUMMARY OF THE DISCLOSURE

The disclosure provides a controlling device, a gimbal on which the controlling device is applied and a method for controlling the gimbal which are easy to operate and have a good hand feeling, so as to solve the problems of a gimbal in the prior art that it is inconvenient to operate and has a bad hand feeling, since a plurality of keypads or a remote controller are employed to control wirelessly the optical device to perform a rotation, a pitch and so on.

The technical solutions adopted by the disclosure in order to solve technical problems thereof are as follows.

According to an aspect of the disclosure, a gimbal for controlling an optical device to perform an action is provided. The gimbal may comprise a controlling device, a controlling assembly connected with the controlling device, and a performing assembly connected with the controlling assembly.

In some embodiments, the controlling device may comprise a rocker for receiving an action instruction and generating a control instruction to be sent to the controlling assembly, wherein the rocker may comprise a rocker handle and a potentiometer assembly connected with the rocker handle.

In some embodiments, the controlling assembly may be configured for generating, based on the control instruction sent by the controlling device, a performing instruction for implementing a corresponding action, and sending the performing instruction to the performing assembly.

In some embodiments, the performing assembly may be configured for implementing a directional control for the optical device according to the performing instruction.

In some embodiments, the potentiometer assembly may comprise a first potentiometer for controlling a pitch action of the optical device and a second potentiometer for controlling a rotation action of the optical device.

In some embodiments, the rocker may further comprise a keypad for switching operating modes of the gimbal.

In some embodiments, the controlling device may further comprise a support arm for supporting the rocker and a bracket located on an end of the support arm.

In some embodiments, the support arm is in a bucket shape.

In some embodiments, the performing assembly may comprise a first rotation member, a second rotation member connected with the first rotation member, a carrying member connected with the second rotation member, a first motor for driving the second rotation member to rotate relative to the first rotation member and a second motor for driving the carrying member to rotate relative to the second rotation member.

According to another aspect of the disclosure, a controlling device for controlling an action of a gimbal is provided. The controlling device may comprise a rocker for receiving a control instruction and sending the control instruction to a controlling assembly, and the rocker may comprise a rocker handle and a potentiometer assembly connected with the rocker handle.

In some embodiments, the potentiometer assembly may comprise a first potentiometer for controlling a pitch action of an optical device via the gimbal and a second potentiometer for controlling a rotation action of the optical device via the gimbal.

In some embodiments, the rocker may further comprise a keypad for switching operating modes of the gimbal.

According to a further aspect of the disclosure, a method for controlling a gimbal is provided for controlling an optical device to perform an action. The method may comprise receiving an action instruction and generating a control instruction by a rocker. The method may also comprise sending the control instruction to a controlling assembly. The method may further comprise generating, based on the control instruction, a performing instruction for implementing a corresponding action and sending the performing instruction to a performing assembly. The method may additionally comprise implementing, by the performing assembly, a directional control for the optical device according to the performing instruction.

In some embodiments, the potentiometer assembly may comprise a first potentiometer for controlling a pitch action of the optical device via the gimbal and a second potentiometer for controlling a rotation action of the optical device via the gimbal.

In some embodiments, the rocker may further comprise a keypad for switching operating modes of the gimbal.

The embodiments of the disclosure can realize the technical effects of easy operation and good hand feeling, since the rocker is utilized to send the control instruction.

DETAILED DESCRIPTION OF THE DISCLOSURE

For a clear understanding of the technical features, objects and advantages of the disclosure, specific embodiments of the disclosure will now be explained in detail in conjunction with the accompanying drawings.

According to embodiments of the disclosure, a gimbal is provided, which may be loaded with an optical device thereon, for example, a video camera, a still camera, a telescope, a remote video camera, a measuring instrument and so on. The gimbal may be configured for fixing the optical device and optionally adjusting an attitude of the optical device (for example, change a height, an inclination angle, a shooting direction of the optical device and/or keep the optical device stable in a determined attitude) in order to obtain high quality videos and/or photos and so on.

Figure 1:
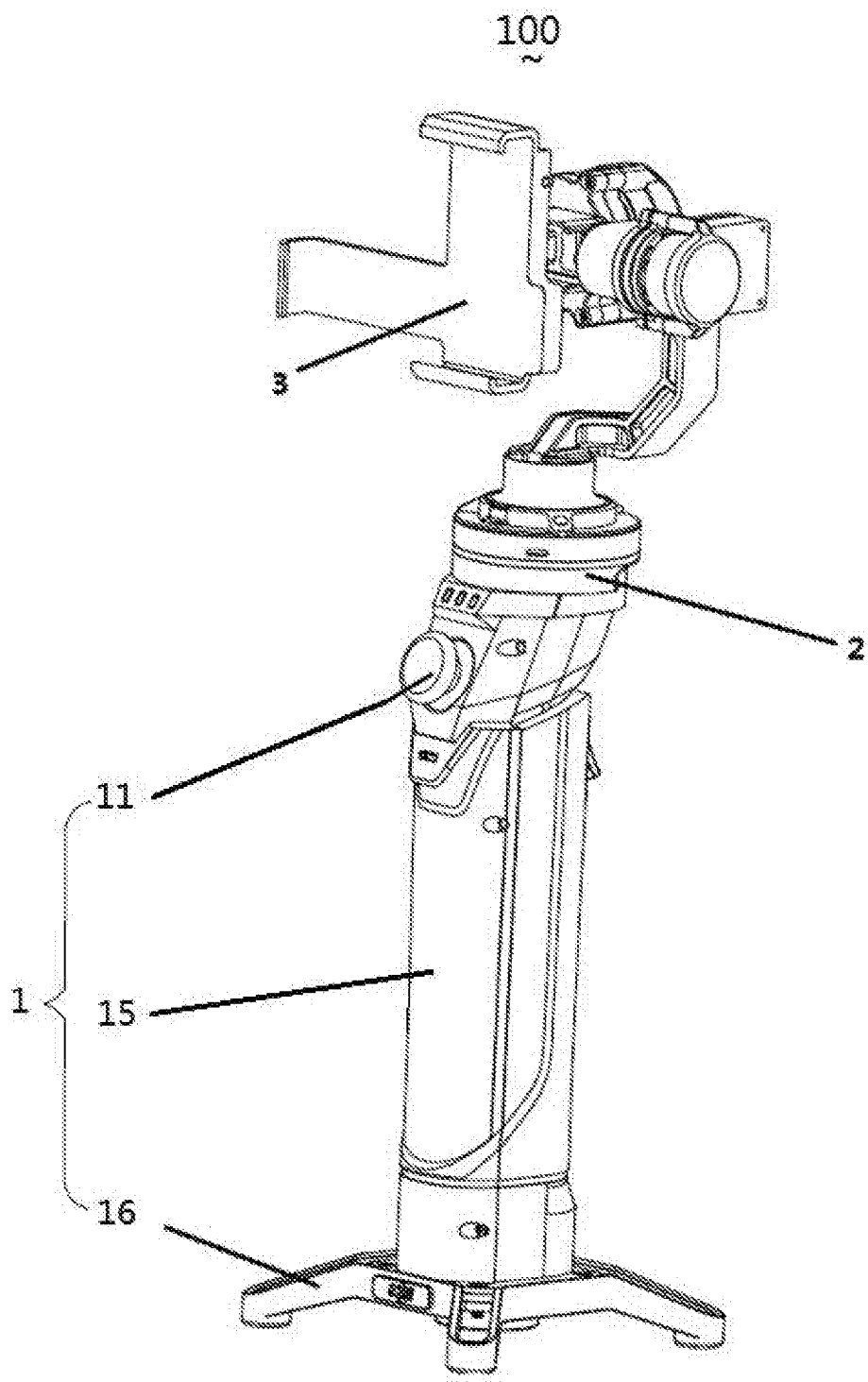
FIG. 1 is a structural schematic diagram of a gimbal according to an embodiment of the disclosure.
Figure 2:
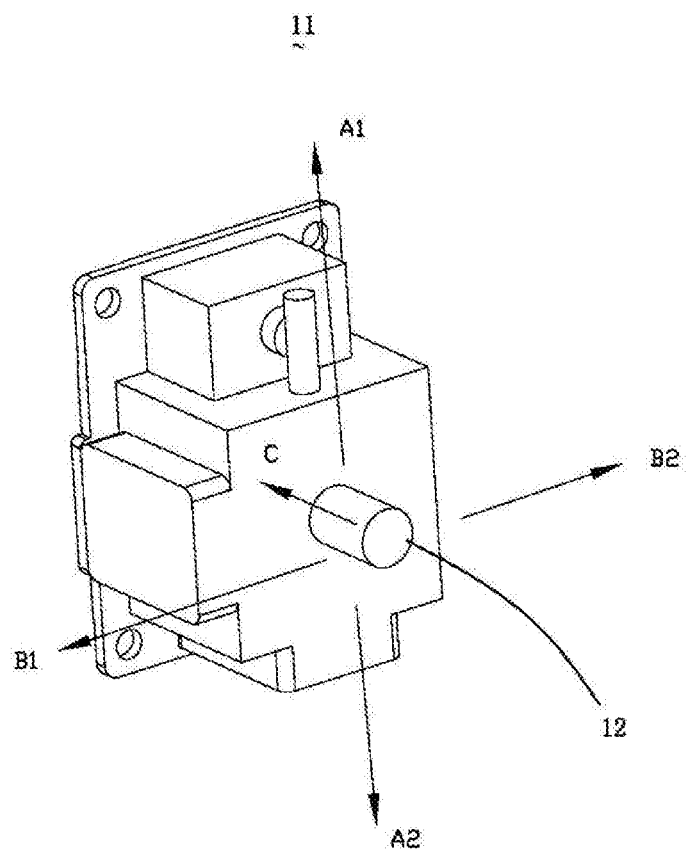
FIG. 2 is a perceptive view of a rocker of a gimbal according to an embodiment of the disclosure.
Figure 3:
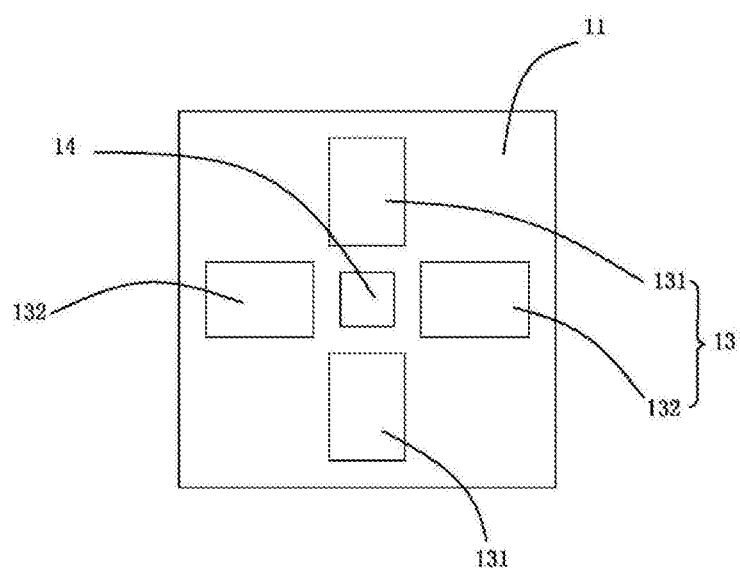
FIG. 3 is a partial structural schematic diagram of a rocker of a gimbal according to an embodiment of the disclosure.
Figure 4:
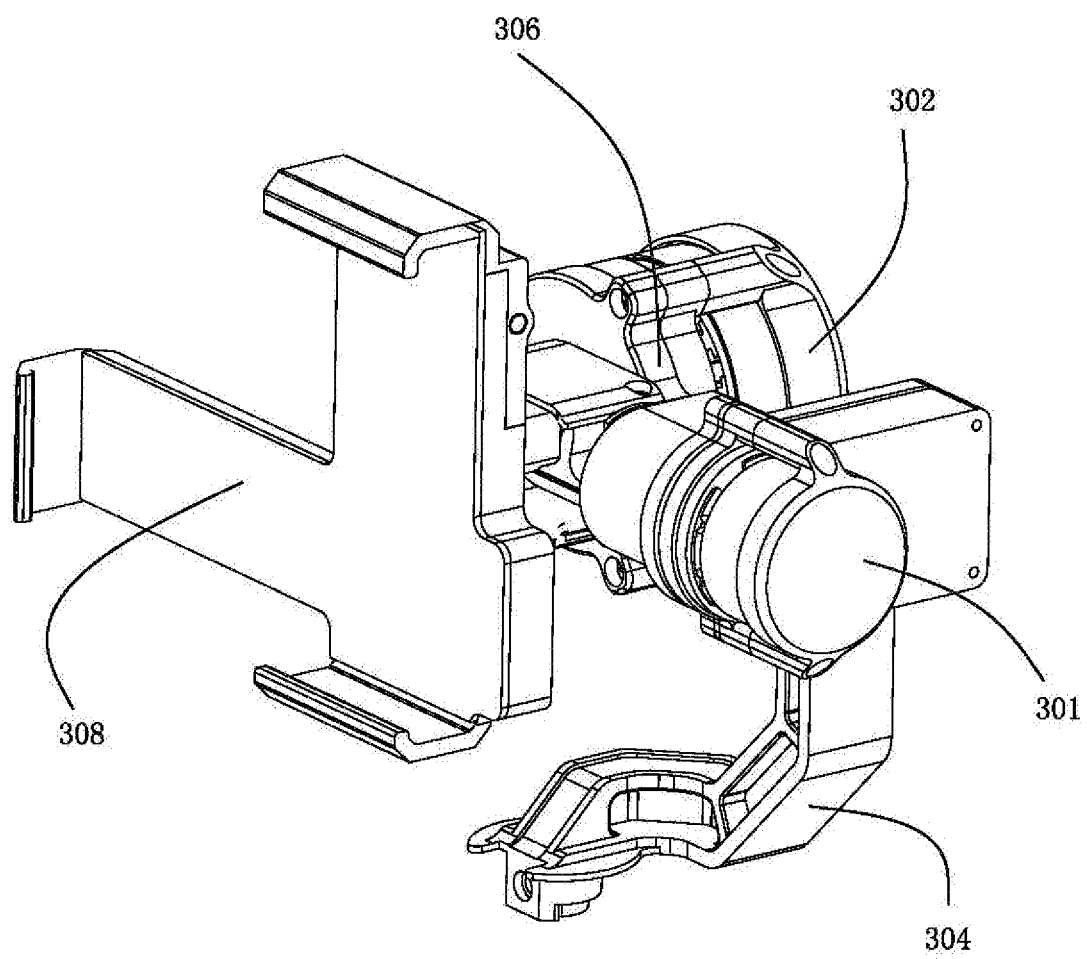
FIG. 4 is a perceptive view of a performing assembly of a gimbal according to an embodiment of the disclosure.

As shown in FIGS. 1 to 4, an embodiment of the disclosure provides a gimbal 100 configured to be loaded with an optical device, to control the optical device to perform actions, and to implement actions of the optical device such as pitch and/or rotation. The gimbal 100 may comprise a controlling device 1, a controlling assembly 2 connected with the controlling device 1, and a performing assembly 3 connected with the controlling assembly 2. In some embodiments, the controlling assembly 2 may be disposed between the controlling device 1 and the performing assembly 3.

In some embodiments, the controlling device 1 may comprise a rocker 11 configured for receiving an action instruction sent by a user and generating a control instruction to be sent to the controlling assembly 2. The rocker 11 may comprise a rocker handle 12 as well as a potentiometer assembly 13 and a keypad 14 respectively connected with the rocker handle 12.

In some embodiments, the rocker handle 12 may be movable along an up direction A1, along a down direction A2, along a left direction B1, along a right direction B2 and along a press direction C.

In some embodiments, the potentiometer assembly 13 may comprise a first potentiometer 131 configured for controlling a pitch action of the optical device and a second potentiometer 132 configured for controlling a rotation action of the optical device.

In some embodiments, the keypad 14 may be configured for switching operating modes of the gimbal 100 which may comprise a follow mode and a locked mode. In the follow mode, not only a swing caused during the movement of the gimbal 100 may be filtered out, but also the shooting direction of the optical device may follow up with the moving direction of the gimbal 100. In the locked mode, the shooting direction of the optical device may be already locked in a specified direction (for example, an initial direction of the optical device), regardless of how the gimbal 100 moves. Both of the above two modes may be suitable for a single person to shoot with the optical device and control the direction of the optical device at the same time.

In some instances, the controlling assembly 2 may be connected with the controlling device 1, and may be configured for generating, based on a control instruction sent by the controlling device 1, a performing instruction for implementing a corresponding action, and sending the performing instruction to the performing assembly 3.

In some instances, the performing assembly 3 may be configured for implementing an action control for the optical device according to the performing instruction.

Further, the controlling device 1 may also comprise a support arm 15 for supporting the rocker 11, and a bracket 16 located on an end of the support arm 15. The support arm 15 may be in a hollow bucket shape.

In some instances, the performing assembly 3 may comprise a first rotation member 304, a second rotation member 306 rotatably connected with the first rotation member 304, a carrying member 308 connected with the second rotation member 306, a first motor 301 for driving the second rotation member 306 to rotate relative to the first rotation member 304, and a second motor 302 for driving the carrying member 308 to rotate relative to the second rotation member 306. The optical device may be loaded on the carrying member 308. The first motor 301 may drive the second rotation member 306 to rotate relative to the first rotation member 304, therefore enabling the optical device loaded on the carrying member 308 to perform a pitch action; the second motor 302 may drive the carrying member 308 to rotate relative to the second rotation member 306, therefore enabling the optical device loaded on the carrying member 308 to perform a rotation action (i.e. an action of leftward or rightward tilt).

Further, in some embodiments, by controlling the rocker handle 12 in the controlling device 1, a user may send the rocker 11 six kinds of action instructions which are respectively: a short press action instruction, a long press action instruction, a push-up action instruction, a push-down action instruction, a push-left action instruction and a push-right action instruction. In some embodiments, the short press action instruction may mean that the user may press the rocker handle 12 along the press direction C for a short time when the rocker handle 12 is in the middle position of the rocker 11; the long press action instruction may mean that the user may press the rocker handle 12 along the press direction C for a long time when the rocker handle 12 is in a non-middle position of the rocker 11. In some embodiments, the "short time" may be less than 3 seconds; and the "long time" may be longer than 3 seconds. Of course, the duration of the "short time" and "long time" may be adjusted according to actual requirements. With regard to the middle position of the rocker 11, the push-up action instruction may mean that the user may push the rocker handle 12 along the up direction A1; the push-down action instruction may mean that the user may push the rocker handle 12 along the down direction A2; the push-left action instruction may mean that the user may push the rocker handle 12 along the left direction B1; and the push-right action instruction may mean that the user may push the rocker handle 12 along the right direction B2.

In some instances, when the user sends the push-up action instruction to the rocker 11, that is, the user pushes the rocker handle 12 to move along the up direction A1, the first motor 301 may accelerate forwardly.

In some instances, when the user sends the push-down action instruction to the rocker 11, that is, the user pushes the rocker handle 12 to move along the down direction A2, the first motor 301 may accelerate reversely.

In some instances, when the user sends the push-left action instruction to the rocker 11, that is, the user pushes the rocker handle 12 to move along the left direction B1, the second motor 302 may accelerate forwardly.

In some instances, when the user sends the push-right action instruction to the rocker 11, that is, the user pushes the rocker handle 12 to move along the right direction B2, the second motor 302 may accelerate reversely.

In some instances, when the rocker handle 12 is in the middle position and the user sends the short press action instruction to the rocker 11, that is, the user presses the rocker handle 12 along the press direction C for a short time, the gimbal 100 may be switched from one operating mode to another operating mode. In some embodiments, the gimbal 100 may have two operating modes comprising a follow mode and a locked model. For example, when the gimbal 100 is in the follow mode, if the user sends the short press action instruction to the rocker 11, the operating mode of the gimbal 100 may be switched to the locked mode. Alternatively, when the gimbal 100 is in the locked mode, if the user sends the short press action instruction to the rocker 11, the operating mode of the gimbal 100 may be switched to the follow mode.

When the rocker handle 12 is in a non-middle position, if the user sends the long press action instruction to the rocker 11, the rocker handle 12 may return to the middle position.

In addition, when the rocker handle 12 is in the middle position, the first motor 301 and the second motor 302 may be in a stationary state but powered so as to hold torque.

In some embodiments, control instructions of the controlling device 1 may comprise a look-up control instruction, a look-down control instruction, a leftward-tilt control instruction, a rightward-tilt control instruction, a back-to-middle control instruction and a switch control instruction.

In some embodiments, performing instructions of the controlling assembly 2 may comprise a look-up performing instruction, a look-down performing instruction, a leftward-tilt performing instruction, a rightward-tilt performing instruction, a hold performing instruction and a switch performing instruction.

In particular in use, as the user sends the push-up action instruction to the rocker 11, that is, the user pushes the rocker handle 12 to move along the up direction A1, the rocker handle 12 may contact with the first potentiometer 131, and the rocker handle 12 may send the look-up control instruction to the controlling assembly 2 via the first potentiometer 131; the controlling assembly 2, after receiving the look-up control instruction, may generate the look-up performing instruction for enabling the gimbal 100 to perform the look-up action, and send the look-up performing instruction to the performing assembly 3; the performing assembly 3, after receiving the look-up performing instruction, may control the gimbal 100 to perform the look-up action, that is, the first motor 301 may drive the second rotation member 306 to rotate clockwise relative to the first rotation member 304, therefore enabling the optical device loaded on the carrying member 308 to implement the look-up action to obtain videos and/or photos at corresponding angle of view and so on. Technical solutions that the controlling assembly 2 receives control instructions and sends performing instructions are well known in the present industry and will not be described herein.

In some instances, as the user sends the push-down action instruction to the rocker 11, the rocker handle 12 may contact with the first potentiometer 131, and the rocker handle 12 sends the look-down control instruction to the controlling assembly 2 via the first potentiometer 131; the controlling assembly 2, after receiving the look-down control instruction, may generate the look-down performing instruction for enabling the gimbal 100 to perform a look-down action, and send the look-down performing instruction to the performing assembly 3; the performing assembly 3, after receiving the look-down performing instruction, may control the gimbal 100 to perform the look-down action, that is, the first motor 301 may drive the second rotation member 306 to rotate counterclockwise relative to the first rotation member 304, therefore enabling the optical device loaded on the carrying member 308 to implement the corresponding look-down action to obtain videos and/or photos at corresponding more suitable angle of view and so on.

In some instances, as the user sends the push-left action instruction to the rocker 11, the rocker handle 12 may contact with the second potentiometer 132, and the rocker handle 12 may send the leftward-tilt control instruction to the controlling assembly 2 via the second potentiometer 132; the controlling assembly 2, after receiving the leftward-tilt control instruction, may generate the leftward-tilt performing instruction for enabling the gimbal 100 to perform a leftward-tilt action, and send the leftward-tilt performing instruction to the performing assembly 3; the performing assembly 3, after receiving the leftward-tilt performing instruction, may control the gimbal 100 to perform the leftward-tilt action, that is, the second motor 302 may drive the carrying member 308 to rotate clockwise relative to the second rotation member 306, therefore enabling the optical device loaded on the carrying member 308 to implement the corresponding leftward-tilt action to obtain videos and/or photos at corresponding more suitable angle of view and so on.

In some instances, as the user sends the push-right action instruction to the rocker 11, the rocker handle 12 may contact with the second potentiometer 132, and the rocker handle 12 may send the rightward-tilt control instruction to the controlling assembly 2 via the second potentiometer 132; the controlling assembly 2, after receiving the rightward-tilt control instruction, may generate the rightward-tilt performing instruction for enabling the gimbal 100 to perform a rightward-tilt action, and send the rightward-tilt performing instruction to the performing assembly 3; the performing assembly 3, after receiving the rightward-tilt performing instruction, may control the gimbal 100 to perform the rightward-tilt action, that is, the second motor 302 may drive the carrying member 308 to rotate towards the right relative to the second rotation member 306, therefore enabling the optical device loaded on the carrying member 308 to implement the corresponding action of rotating towards the right to obtain videos and/or photos at corresponding more suitable angle of view and so on.

In some instances, when the rocker handle 12 is in the middle position and the user sends the short press action instruction to the rocker 11, the rocker handle 12 may contact with the keypad 14, and the rocker handle 12 may send the switch control instruction to the controlling assembly 2 via the keypad 14. The controlling assembly 2, after receiving the switch control instruction, may generate the switch performing instruction for enabling the gimbal 100 to perform operating mode switch, and send the switch performing instruction to the performing assembly 3. The performing assembly 3, after receiving the switch performing instruction, may switch operating mode of the gimbal 100. For example, when the gimbal 100 is in the follow mode, if the user sends the short press action instruction to the rocker 11, the operating mode of the gimbal 100 may be switched to the locked mode. Alternatively, in some embodiments, when the gimbal 100 is in the locked mode, if the user sends the short press action instruction to the rocker 11, the operating mode of the gimbal 100 may be switched to the follow mode.

In some instances, when the rocker handle 12 is held in the position towards the up direction A1 or the down direction A2 from the middle position, if the user sends the long press action instruction to the rocker 11, the rocker handle 12 presses the first potentiometer 131 for a long time, and the rocker handle 12 may send the back-to-middle control instruction to the controlling assembly 2 via the first potentiometer 131. The controlling assembly 2, after receiving the back-to-middle control instruction, may generate the hold performing instruction for enabling the gimbal 100 to hold the current attitude, and send the hold performing instruction to the preforming assembly 3. After the performing assembly 3 receives the hold performing instruction, the first motor 301 may be in a stationary state but powered so as to hold torque. At this time, the rocker handle 12 may return to the middle position.

In some instances, when the rocker handle 12 is held in the position towards the left direction B1 or the right direction B2 from the middle position, if the user sends the long press action instruction to the rocker 11, the rocker handler 12 may press the second potentiometer 132 for a long time, and the rocker handle 12 may send the back-to-middle control instruction to the controlling assembly 2 via the second potentiometer 132. The controlling assembly 2, after receiving the back-to-middle control instruction, may generate the hold performing instruction for enabling the gimbal 100 to hold the current attitude and send the hold performing instruction to the performing assembly 3. After the performing assembly 3 receives the hold performing instruction, the second motor 302 may be in a stationary state but powered so as to hold torque. At this time, the rocker handle 12 may return to the middle position.

The gimbal 100 according to some embodiments of the disclosure is not only easy to operate, but also has a good hand feeling, since the rocker 11 is utilized to send the control instruction.

Figure 5:
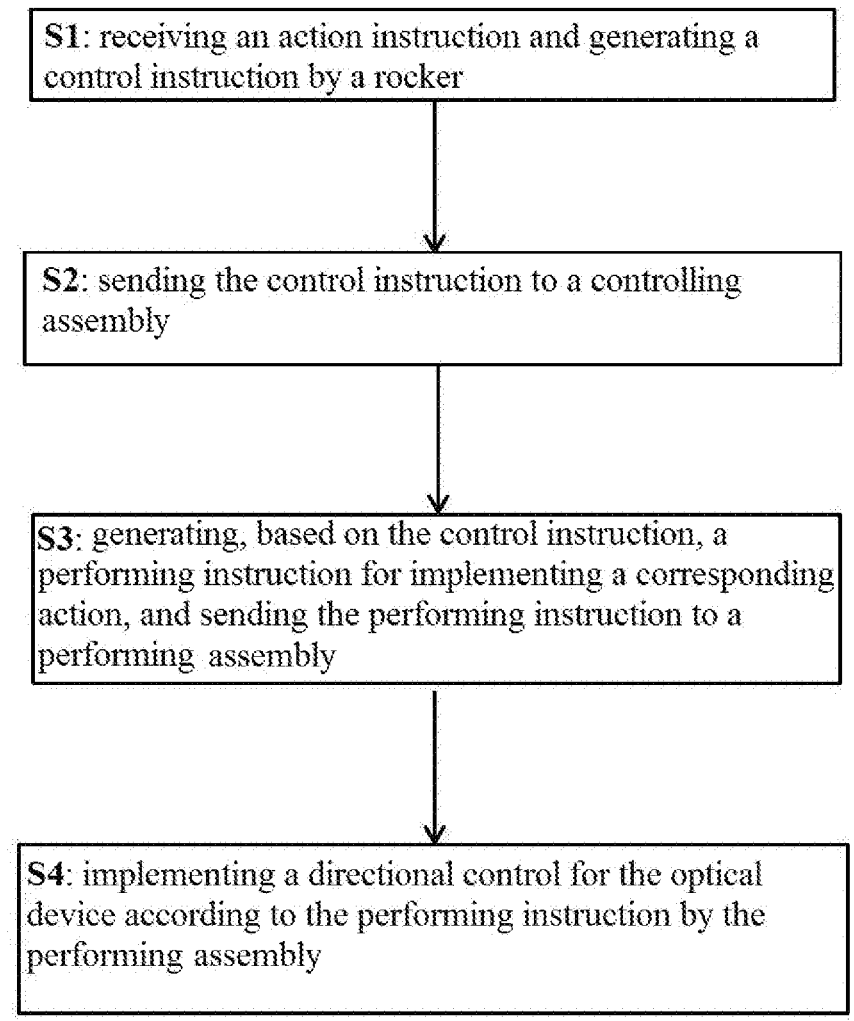
FIG. 5 is a flow chart of a method for controlling a gimbal according to an embodiment of the disclosure.

Referring to FIGS. 1 to 5, an embodiment of the disclosure also provides a method for controlling the gimbal 100, for controlling an optical device to perform action, the method may comprise the following steps:

S1: receiving an action instruction and generating a control instruction by the rocker 11. In some embodiments, the rocker 11 may comprise a rocker handle 12 as well as a potentiometer assembly 13 and a keypad 14 connected with the rocker handle 12. The potentiometer assembly 13 may comprise a first potentiometer 131 for controlling a pitch action of the optical device via the gimbal 100 and a second potentiometer 132 for controlling a rotation action of the optical device via the gimbal 100. In some embodiments, the keypad 14 may be configured for switching operating modes of the gimbal 100.

The user may send the rocker 11 six kinds of action instructions, which may be respectively: a short press action instruction, a long press action instruction, a push-up action instruction, a push-down action instruction, a push-left action instruction and a push-right action instruction.

In some embodiments, the control instructions may be respectively: a look-up control instruction, a look-down control instruction, a leftward-tilt control instruction, a rightward-tilt control instruction, a back-to-middle control instruction, and a switch control instruction.

In some embodiments, when the user sends the push-up action instruction to the rocker 11, that is, the user pushes the rocker handle 12 to move along the up direction A1, the rocker handle 12 may contact with the first potentiometer 131, therefore generating the look-up control instruction.

In some embodiments, when the user sends the push-down action instruction to the rocker 11, that is, the user pushes the rocker handle 12 to move along the down direction A2, the rocker handle 12 may contact with the first potentiometer 131, therefore generating the look-down control instruction.

In some embodiments, when the user sends the push-left action instruction to the rocker 11, that is, the user pushes the rocker handle 12 to move along the left direction B1, the rocker handle 12 may contact with the second potentiometer 132, therefore generating the leftward-tilt control instruction.

In some embodiments, when the user sends the push-right action instruction to the rocker 11, that is, the user pushes the rocker handle 12 to move along the right direction B2, the rocker handle 12 may contact with the second potentiometer 132, therefore generating the rightward-tilt control instruction.

In some instances, when the rocker handle 12 is in the middle position and the user sends the short press action instruction to the rocker 11, that is, the user presses the rocker handle 12 for a short time, the rocker handle 12 may contact with the keypad 14, therefore generating the switch control instruction. The gimbal 100 may be switched from one operating mode to another operating mode. In some embodiments, the gimbal 100 may have two operating modes comprising a follow mode and a locked mode. For example, when the gimbal 100 is in the follow mode, if the user sends the short press action instruction to the rocker 11, the operating mode of the gimbal 11 may be switched to the locked mode. Alternatively, when the gimbal 100 is in the locked mode, if the user sends the short press action instruction to the rocker 11, the operating mode of the gimbal 100 may be switched to the follow mode.

In some instances, when the rocker handle is in a non-middle position, as the user sends the long press action instruction to the rocker 11, the rocker handle 2 may contact with the first potentiometer 131 or the second potentiometer 132, therefore generating the back-to-middle control instruction. The rocker handle 12 may return to the middle position.

In addition, when the rocker handle 12 is in the middle position, the first motor 301 and the second motor 302 may be in a stationary state but powered so as to hold torque.

S2: sending the control instruction to a controlling assembly 2;

In some instances, as the user operates the rocker 11 to push it to move towards the up direction A1 through the rocker handle 12, the rocker 11 may send a control instruction for a look-up action to the controlling assembly 2 via the first potentiometer 131. As the user operates the rocker 11 to push it to move towards the down direction A2 through the rocker handle 12, the rocker 11 may send a control instruction for a look-down action to the controlling assembly 2 via the first potentiometer 131. As the user operates the rocker 11 to push it to move towards the left direction B1 through the rocker handle 12, the rocker 11 may send a control instruction for a left-rotating action to the controlling assembly 2 via the second potentiometer 132. As the user operates the rocker 11 to push it to move towards the right direction B2 through the rocker handle 12, the rocker 11 may send a control instruction for a right-rotating action to the controlling assembly 2 via the second potentiometer 132. When the rocker 11 is in the middle position, as the user presses the rocker handle 12 for a short time, the rocker 11 may send the switch control instruction to the controlling assembly 2 via the keypad 14. When the rocker 11 is in a non-middle position, as the user presses the rocker handle 12 for a long time, the rocker 11 may send the back-to-middle control instruction to the controlling assembly 2 via the first potentiometer 131 or the second potentiometer 132.

S3: generating, based on the control instruction, a performing instruction for implementing a corresponding action, and sending the preforming instruction to the performing assembly 3.

In some embodiments, the performing instructions of the controlling assembly 2 may comprise a look-up performing instruction, a look-down performing instruction, a leftward-tilt performing instruction, a rightward-tilt performing instruction, a hold performing instruction and a switch performing instruction.

In some instances, the controlling assembly 2, after receiving the look-up control instruction, may generate the look-up performing instruction for enabling the gimbal 100 to perform a look-up action and send the look-up performing instruction to the performing assembly 3.

In some instances, the controlling assembly 2, after receiving the look-down control instruction, may generate the look-down performing instruction for enabling the gimbal 100 to perform a look-down action and send the look-down performing instruction to the performing assembly 3.

In some instances, the controlling assembly 2, after receiving the leftward-tilt control instruction, may generate the leftward-tilt performing instruction for enabling the gimbal 100 to perform a leftward-tilt action and send the leftward-tilt performing instruction to the performing assembly 3.

In some instances, the controlling assembly 2, after receiving the rightward-tilt control instruction, may generate the rightward-tilt performing instruction for enabling the gimbal 100 to perform a rightward-tilt action and send the rightward-tilt performing instruction to the performing assembly 3.

In some instances, the controlling assembly 2, after receiving the back-to-middle control instruction, may generate the hold performing instruction for enabling the gimbal 100 to hold the current attitude and send the hold performing instruction to the performing assembly 3.

In some instances, the controlling assembly 2, after receiving the switch control instruction, may generate the switch performing instruction for enabling the gimbal 100 to perform operating mode switch and send the switch performing instruction to the performing assembly 3.

S4: implementing a directional control for the optical device according to the performing instruction by the performing assembly 3.

In some instances, the performing assembly 3, after receiving the look-up performing instruction, may control the gimbal 100 to perform a look-up action, that is, the first motor 301 may drive the second rotation member 306 to rotate clockwise relative to the first rotation member 304, therefore enabling the optical device loaded on the carrying member 308 to implement a corresponding look-up action, to obtain videos and/or photos at corresponding angle of view and so on. The technical solutions that the controlling assembly 2 receives control instructions and sends performing instructions are well known in the present industry and will not be described herein.

In some instances, the preforming assembly 3, after receiving the look-down performing instruction, may control the gimbal 100 to perform a look-down action, that is, the first motor 301 may drive the second rotation member 306 to rotate counterclockwise relative to the first rotation member 304, therefore enabling the optical device loaded on the carrying member 308 to implement the corresponding look-down action, to obtain videos and/or photos at corresponding more suitable angle of view.

In some instances, the preforming assembly 3, after receiving the leftward-tilt performing instruction, may control the gimbal 100 to perform a left-rotating action, that is, the second motor 302 may drive the carrying member 308 to rotate clockwise relative to the second rotation member 306, therefore enabling the optical device loaded on the carrying member 308 to implement the corresponding left-rotating action, to obtain videos and/or photos at corresponding more suitable angle of view.

In some instances, the preforming assembly 3, after receiving the rightward-tilt performing instruction, may control the gimbal 100 to perform a right-rotating action, that is, the second motor 302 may drive the carrying member 308 to rotate counterclockwise relative to the second rotation member 306, therefore enabling the optical device loaded on the carrying member 308 to implement the corresponding right-rotating action, to obtain videos and/or photos at corresponding more suitable angle of view.

In some instances, the performing assembly 3, after receiving the hold performing instruction, may control the gimbal 100 to hold the current attitude, that is, the first motor 301 and the second motor 302 may be in the stationary state but powered so as to hold torque.

In some instances, the performing assembly 3, after receiving the switch performing instruction, may switch the current operating mode of the gimbal 100. For example, when the gimbal 100 is in the follow mode, the operating mode of the gimbal may be switched to the locked mode. Alternatively, when the gimbal is in the locked mode, the operating mode of the gimbal 100 may be switched to the follow mode.

The method for operating gimbal 100 according to an embodiment of the disclosure is not only easy to operate, but also has a good hand feeling, since the rocker 11 is utilized to send the control instruction.

While embodiments of the present disclosure have been described in connection with the drawings above, the scope of the present disclosure is not limited thereto. The embodiments are merely illustrative, but not limiting. Any equivalent modifications and variations, which are made by those skilled in the art according to the teachings disclosed in the present disclosure without departing from the purpose and the scope protected by the appended claims, shall fall into the protection scope set forth in the appended claims.

What is claimed is:

1. A gimbal for controlling an optical device, the gimbal comprising:
   a control device configured to receive an action instruction and generate a control instruction based on the action instruction, the action instruction including a press action instruction, and the control instruction including a switch control instruction for switching the gimbal from a first operating mode to a second operating mode,
   wherein the first operating mode and the second operating mode cause different relative movements between the gimbal and the optical device,
   wherein the first operating mode and the second operating mode are selected from (1) a follow mode in which a shooting direction of the optical device follows a moving direction of the gimbal and (2) a locked mode in which the shooting direction of the optical device is locked in a specified direction regardless of movement of the gimbal; and
   a controlling assembly configured to receive the control instruction from the control device and generate a performing instruction based on the control instruction for controlling the optical device.

2. The gimbal of claim 1, wherein the press action instruction is a short press action instruction, wherein the action instruction further includes a long press action instruction when a control handle of the control device is deviated from a middle position, and the control instruction further includes a back-to-middle control instruction corresponding to the long press action instruction and configured to allow the control handle to return to the middle position.

3. The gimbal of claim 1, wherein the control device comprises a control handle configured to control an attitude of the optical device.

4. The gimbal of claim 3, wherein the control device further comprises a keypad operably connected to the control handle to detect the press action instruction for switching the gimbal between the first and the second operating modes.

5. The gimbal of claim 3, wherein the control device further comprises a potentiometer assembly operably connected to the control handle, and the potentiometer assembly comprises a first potentiometer configured to control a pitch action of the optical device and a second potentiometer configured to control a rotation action of the optical device.

6. The gimbal of claim 3, wherein the action instruction is determined to be a short press action instruction or a long press action instruction based on a duration of which the control handle is being pressed along a press direction.

7. The gimbal of claim 1, further comprising:
   a support arm, wherein the control device is supported on a top end of the support arm.

8. The gimbal of claim 7, further comprising:
   a bracket disposed at a bottom end of the support arm that is opposite to the top end of the support arm, wherein the bracket is configured to hold the gimbal and the optical device upright on a flat surface.

9. The gimbal of claim 7, further comprising:
   a performing assembly configured to implement the performing instruction, wherein the control device is disposed between the performing assembly and the support arm.

10. A method for controlling an optical device comprising:
    receiving, via a control device of a gimbal, an action instruction including a press action instruction;
    generating, via the control device of the gimbal, a control instruction based on the action instruction, the control instruction including a switch control instruction for switching the gimbal from a first operating mode to a second operating mode,
    wherein the first operating mode and the second operating mode cause different relative movements between the gimbal and the optical device,
    wherein the first operating mode and the second operating mode are selected from (1) a follow mode in which a shooting direction of the optical device follows a moving direction of the gimbal and (2) a locked mode in which the shooting direction of the optical device is locked in a specified direction regardless of movement of the gimbal; and
    generating, via a controlling assembly of the gimbal, a performing instruction based on the control instruction received from the control device for controlling the optical device.

11. The method of claim 10, wherein the press action instruction is a short press action instruction, wherein the action instruction further includes a long press action instruction when a control handle of the control device is deviated from a middle position, and the control instruction further includes a back-to-middle control instruction corresponding to the long press action instruction and configured to allow the control handle to return to the middle position.

12. The method of claim 10, wherein the control device comprises a control handle configured to control an attitude of the optical device.

13. The method of claim 12, wherein the control device further comprises a keypad operably connected to the control handle to detect the press action instruction for switching the gimbal between the first and the second operating modes.

14. The method of claim 12, wherein the control device further comprises a potentiometer assembly operably connected to the control handle, and the potentiometer assembly comprises a first potentiometer configured to control a pitch action of the optical device and a second potentiometer configured to control a rotation action of the optical device.

15. A control device comprising:
    a control handle configured to control an attitude of an optical device carried by a gimbal; and
    a keypad operably connected to the control handle, the keypad configured to switch the gimbal between two or more operating modes;
    wherein the control device is configured to receive an action instruction through the control handle or the keypad and generate a control instruction based on the action instruction;
    wherein the action instruction includes a press action instruction, the control instruction includes a switch control instruction for switching the gimbal from a first operating mode to a second operating mode, and the first operating mode and the second operating mode cause different relative movements between the gimbal and the optical device;
    wherein the first operating mode and the second operating mode are selected from (1) a follow mode in which a shooting direction of the optical device follows a moving direction of the gimbal and (2) a locked mode in which the shooting direction of the optical device is locked in a specified direction regardless of movement of the gimbal; and wherein the control instruction is used to generate a performing instruction for controlling the optical device.

16. The control device of claim 15, wherein the press action instruction is a short press action instruction, wherein the action instruction further includes a long press action instruction when the control handle is deviated from a middle position, and the control instruction further includes a back-to-middle control instruction corresponding to the long press action instruction and configured to allow the control handle to return to the middle position.

17. The control device of claim 15, further comprising:
a potentiometer assembly operably connected to the control handle, wherein the potentiometer assembly comprises a first potentiometer configured to control a pitch action of the optical device and a second potentiometer configured to control a rotation action of the optical device.

* * * * *